US006578617B1

(12) United States Patent
Biagiotti

(10) Patent No.: US 6,578,617 B1
(45) **Date of Patent: *Jun. 17, 2003**

(54) DEVICE FOR EMBOSSING AND LAMINATING WEB MATERIAL CONSISTING OF TWO OR MORE PLIES

(75) Inventor: Guglielmo Biagiotti, Capannori Lucca (IT)

(73) Assignee: Fabio Perini, S.p.A., Lucca (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,070

(22) PCT Filed: May 26, 1998

(86) PCT No.: PCT/IT98/00134

§ 371 (c)(1), (2), (4) Date: Nov. 18, 1999

(87) PCT Pub. No.: WO98/53985

PCT Pub. Date: Dec. 3, 1998

(30) Foreign Application Priority Data

May 30, 1997 (IT) ........................................ F197A0128

(51) Int. Cl.[7] ................................................ B32B 31/08

(52) U.S. Cl. ....................... 156/553; 156/555; 156/209; 162/112; 162/362

(58) Field of Search ................................ 156/205–210, 156/462, 470–473, 553, 555; 162/112, 362

(56) References Cited

U.S. PATENT DOCUMENTS 3,694,300 A 9/1972 Small
3,738,905 A * 6/1973 Thomas ...................... 156/205
3,867,225 A * 2/1975 Nystrand .................... 156/209
4,483,728 A * 11/1984 Bauernfeind ................ 156/209
4,738,744 A * 4/1988 Saller ......................... 156/472
4,818,330 A * 4/1989 Mosburger .................. 156/473
4,978,565 A 12/1990 Pigneul
5,215,617 A * 6/1993 Grupe ........................ 156/209
5,339,730 A * 8/1994 Ruppel et al. ................ 101/32
5,785,802 A * 7/1998 Seki et al. .................. 156/361
5,951,816 A * 9/1999 Marschke ................... 156/472
6,277,226 B1 * 8/2001 Schulz ....................... 156/209
6,470,945 B1 * 10/2002 Biagiotti ..................... 292/181

FOREIGN PATENT DOCUMENTS

EP 0 370 972 A1 5/1990
FR 2 684 598 A1 6/1993
FR WO-9311929 A1 * 6/1993
IT 1 213 842 1/1990
IT 2 132 589 U 3/1991
WO WO 97/20689 6/1997

OTHER PUBLICATIONS

Biagiotti, Guglielmo; Italian Patent Application; IT 1213842; Jan. 5, 1990.*

* cited by examiner

*Primary Examiner*—Michael W. Ball
*Assistant Examiner*—Jessica Rossi
(74) *Attorney, Agent, or Firm*—Breiner & Breiner, L.L.C.

(57) ABSTRACT

An embossing and laminating device which includes a pair of embossing cylinders having tips arranged symmetrically on the two cylinders; a pair of pressure rollers, each of which works in conjunction with one of the embossing cylinders; a glue applicator associated with one of the two embossing cylinders; and a laminating roller positioned downstream of the nip between the embossing cylinders and working in conjunction with the embossing cylinder which is associated with the glue applicator. The embossing cylinder associated with the laminating roller has a diameter greater than that of the other embossing cylinder.

12 Claims, 3 Drawing Sheets

DEVICE FOR EMBOSSING AND LAMINATING WEB MATERIAL CONSISTING OF TWO OR MORE PLIES

TECHNICAL FIELD

The present invention relates to a device for embossing and laminating continuous plies in order to form a web material.

More specifically, the present invention relates to an embossing and laminating device of the type comprising a pair of embossing cylinders, each of which works in conjunction with a corresponding pressure roller, with a glue applicator which applies glue to at least one of the embossed plies, and with laminating means which join together two plies that have been embossed separately between each embossing cylinder and its corresponding pressure roller.

BACKGROUND ART

In the paper converting industry, embossing is often used in the production of toilet paper, kitchen towels, paper serviettes, tissues and similar products in order to modify the paper's softness and absorbency.

There are various embossing and laminating systems for the production of embossed web materials obtained by joining together two or more plies. In particular, systems exist in which two or more plies of continuous material are embossed separately and then joined together. These systems can basically be subdivided into tip-to-tip laminating systems and nested laminating systems, so-called random nested or "DERL" systems or the like.

In the first case (see EP-B-0,370,972), each of the two plies is embossed between an embossing cylinder, which has projections or tips arranged in a repeating pattern, and a pressure roller, which is usually covered in a yielding material such as rubber or the like. The two plies are then joined together by being laminated between the two opposing embossing cylinders which are synchronized so that the tips of one cylinder coincide with the tips of the other cylinder in the lamination nip between the two cylinders, the distance between the cylinders being such as to cause lamination of the plies between the opposing tips. A glue is usually applied to one of the two plies—to the raised areas produced by the embossing action—prior to lamination.

With embossing and lamination of the "nested" type, on the other hand, the plies—which have been embossed separately in a way similar to that described above—are joined together so that the protrusions of one ply fit between the protrusions of the other ply. In these cases the two embossing cylinders are not pressed against each other in the nip between them and the two plies are joined together by being laminated between one of the two embossing cylinders and a laminating roller. This technique is described in GB-B-1,225,440 and in U.S. Pat. No. 3,694,300.

Italian patent No. 1,213,842 (appl. No. 9519A/87) describes an embossing unit of the tip-to-tip type which has been modified in order to produce a random type nested embossed pattern ("DERL"). This is achieved by inserting a diverting element which modifies the path of one of the two plies between the embossing zone and the lamination zone.

Italian utility model application No. 21,325B/89 describes a device that allows both nested type embossing and tip-to-tip type embossing to be carried out by modifying the position of the device members as and when necessary. Basically, in order to switch from one operational mode to the other, the position of the embossing cylinders needs to be altered completely. In practice, what this known technique is in fact suggesting is to convert a conventional tip-to-tip embossing unit into a conventional nested embossing unit each time. This means that very lengthy intervention times are needed in order to change over from one type of embossing to the other. Furthermore, in order to be able to position the laminating roller in this device such that it can work in conjunction with one of the embossing cylinders, it has been necessary to locate the axes of the two embossing cylinders and of the two pressure rollers in one and the same horizontal plane. This brings with it substantial drawbacks on account of the deformations experienced by the embossing cylinders as a result of the high pressures required during embossing, with the effect that there is uneven embossing and lamination between the center and the edges of the plies.

OBJECTS AND SUMMARY OF THE INVENTION

The object of the present invention is to produce an embossing and laminating unit that can operate in both tip-to-tip and nested mode and in which it is easy to switch from one type of embossing to the other, with any operations to set and adjust the device being reduced a minimum.

A further object of the present invention is to produce an embossing unit in which the embossing cylinders and the pressure rollers are positioned so as to reduce any irregularities in the laminated product which occur as a result of bending of the embossing cylinders.

These objects, together with other objects and advantages which will be apparent to those skilled in the art on reading the following text, are achieved using an embossing and laminating device of the type comprising: a pair of embossing cylinders having tips arranged on the two rollers, said two embossing cylinders being positioned with their axes parallel and adjacent to each other so as to form a nip between them; a pair of pressure rollers, each of which works in conjunction with one of the embossing cylinders; a glue applicator associated with one of said embossing cylinders; and a laminating roller positioned downstream of the nip between the embossing cylinders and working in conjunction with the embossing cylinder which is associated with said glue applicator. Essentially, according to the invention, the embossing cylinder associated with the laminating roller has a diameter greater than that of the other embossing cylinder, and said two embossing cylinders have the same peripheral speed and can be synchronized so that the tips of one embossing cylinder coincide with the tips of the other embossing cylinder or, alternatively, the tips of one embossing cylinder fit between the tips of the other embossing cylinder, without changing the distance between the centers of the cylinders. By using two cylinders having different diameters, sufficient space is created to insert a laminating roller downstream of the nip between the embossing cylinders, even when the two pressure rollers are positioned vertically, one above and one below the corresponding embossing cylinders, the axes of which lie in a horizontal plane.

If the space created by using one embossing cylinder with a diameter greater than that of the other is not sufficient to position the laminating roller, provision may advantageously be made to further increase the space available by ensuring that the plane containing the axes of the embossing cylinder with the larger diameter and the corresponding pressure roller is not perpendicular to the plane containing the axes of the two embossing cylinders. This allows one of the two pressure rollers to be distanced from the plane which is tangential to the embossing cylinders and which passes through the nip between them and also makes more space available in which to position the laminating roller, as well as means for cleaning the surface of the cylinder with the larger diameter, said cleaning means being positioned along the periphery of the cylinder, between the laminating roller and the pressure roller. The cleaning means are used to remove glue residues and dust from the embossing cylinder which is associated with the glue applicator.

The angle formed by the two planes can typically be between 90 and 125° and preferably between 90 and 105°.

BRIEF DESCRIPTION OF THE DRAWINGS

A better understanding of the invention will be gained by following the description and the appended drawing which shows a practical embodiment of said invention. More specifically, in the drawing.

DETAILED DESCRIPTION OF THE PREFERRED EMBODIMENT

Figure 1:
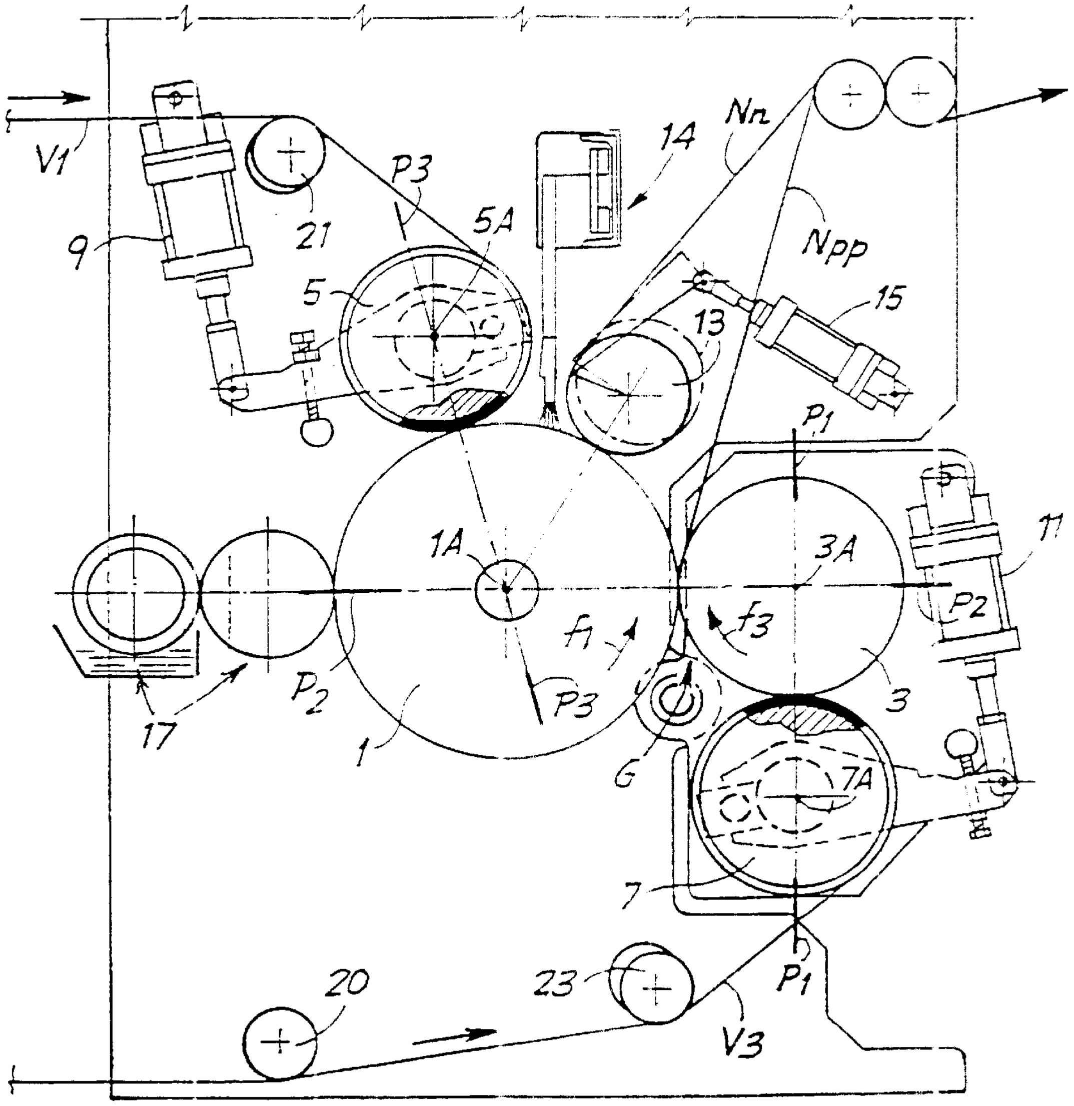
FIG. 1 shows a diagram of the device according to the invention.

Referring initially to FIG. 1, the device comprises a pair of embossing cylinders 1, 3, each of which has a plurality of tips or projections (shown diagrammatically in the subsequent FIGS. 2 to 4) arranged in geometric patterns symmetrically on the two cylinders. The diameter of the cylinder 1 is greater than that of the cylinder 3. The difference in diameter is about 30% in the example illustrated. The two cylinders 1, 3 are connected together mechanically so that they rotate in opposite directions, as shown by the arrows f1 and f3, and at the same peripheral speed. This can be achieved by an appropriate choice of transmission gears (not illustrated).

In a manner known per se, the embossing cylinder 1 works in conjunction with a pressure roller 5, while the cylinder 3 works in conjunction with a pressure roller 7. The two pressure rollers 5 and 7 are covered with a layer of elastically yielding material, for example rubber. Each pressure roller 5, 7 is pressed against its respective embossing cylinder 1, 3 by an actuator 9, 11.

The plane P1 containing the axes 7A, 3A of the pressure roller 7 and of the embossing cylinder 3 forms a 90° angle with the plane P2 containing the axes 1A and 3A of the two embossing cylinders 1, 3. In contrast, the plane P3 containing the axes 5A, 1A of the pressure roller 5 and of the embossing roller 1 forms an angle other than 90° with the plane P2. The obtuse angle formed between the two planes P2 and P3 is about 95–120°. It is kept at the minimum value compatible with the sizes of the parts in order to reduce the horizontal component of the deformation due to the pressure exerted by the pressure roller 5 on the embossing cylinder 1.

This set-up makes space available around the cylinder 1, between the roller 5 and the cylinder 3, in which to locate a laminating roller 13, which works in conjunction with the cylinder 1, for purposes which will be clarified later, as well as a device 14 (of a type known per se) for cleaning the surface of the embossing cylinder 1. The laminating roller 13 is controlled by an actuator 15 so that it assumes an active position, indicated by solid lines in FIG. 1, in which it is pressed against the surface of the embossing cylinder 1, or an inactive position, indicated by dashed lines, in which it is not in contact with the cylinder 1.

A glue applicator 17, of a type known per se, is associated with the embossing cylinder 1. In the example illustrated it comprises two cylinders whose axes of rotation are coplanar with the axes 1A, 3A of the two embossing cylinders 1, 3 in order to reduce the effects of bending on the distribution of the glue and thus ensure that the glue is distributed evenly.

Two plies of material to be embossed, denoted V1 and V3, are fed to the device described hitherto. The reference 20 denotes a roller for guiding the ply V3 while the numerals 21 and 23 denote two widening rollers for the plies V1 and V3 respectively. The ply V1 is embossed between the embossing cylinder 1 and the pressure roller 5, while the ply V3 is embossed between the embossing cylinder 3 and the pressure roller 7. After embossing, a glue C is applied to the ply V1 by means of the applicator 17, in a manner known per se.

The two plies V1, V3 can at this point be joined together in two different ways, depending on how the two embossing rollers 1, 3 are synchronized in relation to each other and on the path followed by the plies downstream of the nip G between the embossing cylinders 1, 3.

Figure 2:
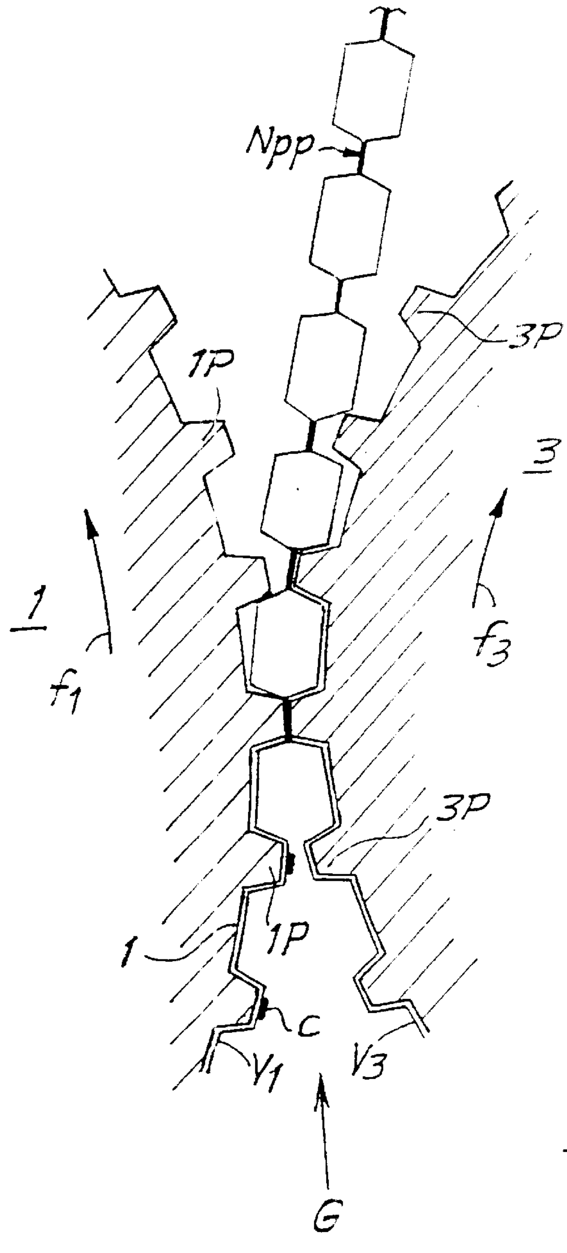
FIG. 2 shows an enlarged diagrammatic section of the nip between the two embossing cylinders during tip-to-tip operation.

FIG. 2 shows an enlargement of the nip G between the two embossing cylinders 1, 3 in the position assumed by them when the device is set for tip-to-tip embossing. In this case the two cylinders 1, 3 are synchronized so that the tips or projections 1P of the cylinder 1 are in phase with the tips or projections 3P of the cylinder 3, in other words so that, where the two cylinders 1, 3 are at their closest, the tips or projections of one cylinder press against the tips or projections of the other, laminating the two embossed plies V1 and V3 between them. The glue applied to the ply V1 causes the plies to stick together. Downstream of the nip G, the web material formed by the two joined plies V1 and V3 follows the path denoted Npp. With this set-up the laminating roller 13 is held away from the embossing cylinder 1.

Figure 3:
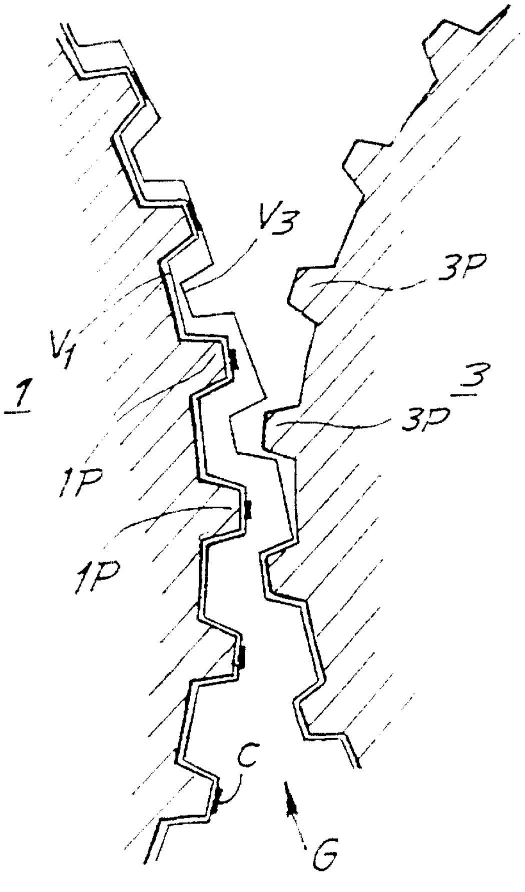
FIG. 3 shows an enlarged diagrammatic section of the nip between the two embossing cylinders during nested operation.
Figure 4:
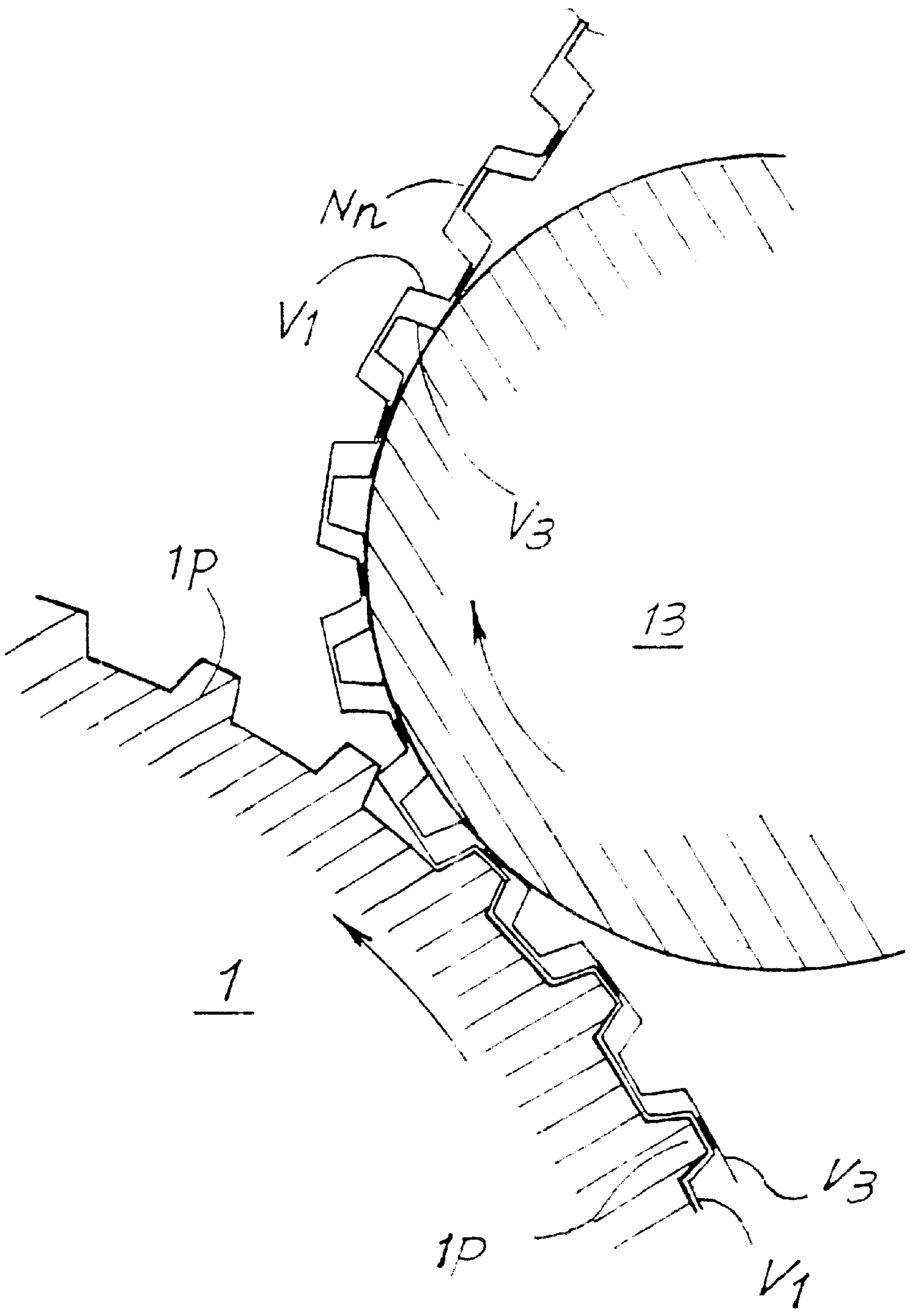
FIG. 4 shows an enlarged diagrammatic section of the lamination zone during nested operation.

FIGS. 3 and 4 show the positions of the embossing cylinders 1, 3 and of the laminating roller 13 when a nested embossed pattern is being produced. The centers of the two embossing cylinders 1 and 3 are set the same distance apart as in the previous case, but they are synchronized differently so that the tips 1P of the embossing cylinder 1 fit between the tips 3P of the embossing cylinder 3. The two embossed plies V1 and V3 are no longer laminated in the nip G between the two embossing cylinders 1, 3 but rather downstream of the nip G between the laminating roller 13 (which in this case is pressed against the tips 1P of the cylinder 1) and the embossing cylinder 1, as illustrated in the diagrammatic enlargement of FIG. 4. Downstream of the laminating roller 13 the web material produced by joining together the plies V1 and V3 follows the path Nn.

It should be understood that the drawing shows only one example, given solely as a practical demonstration, of the invention and that the forms and arrangements of the latter can vary without thereby departing from the scope of the underlying concept of said invention. The presence of reference numerals in the appended claims has the purpose of facilitating the reading of the claims with reference to the description and drawing and does not restrict the scope of protection represented by the claims.

What is claimed is:

1. Embossing and laminating device comprising a pair of embossing cylinders with each cylinder having tips arranged thereon, said pair of embossing cylinders being positioned such that an axis of each cylinder is parallel to each other and said pair of embossing cylinders are adjacent to each other to form a nip therebetween, and each cylinder rotates at a same peripheral speed and in opposite directions; a pair of pressure rollers, each of which works in conjunction with one of said pair of embossing cylinders; a glue applicator associated with a first cylinder of said pair of embossing cylinders; and a laminating roller positioned downstream of the nip and working in conjunction with said first cylinder which is associated with said glue applicator; wherein said first cylinder associated with said laminating roller has a diameter greater than that of a second cylinder of said pair of embossing cylinders;

and said pair of embossing cylinders can have a positioning of their tips changed back and forth from a coinciding configuration so that lamination occurs within said nip to a configuration where the tips of the first cylinder fit between the tips of the second cylinder so that lamination occurs between said laminating roller and said first cylinder by changing a synchronization of said cylinders.

2. Device according to claim 1, wherein said laminating roller can either be made to press against said first cylinder or to move away from the first cylinder.

3. Device according to claim 2, wherein a first plane containing the axis of the first cylinder which is associated with said laminating roller and an axis of the corresponding pressure roller forms an angle other than 90° and 180° with respect to a second plane which contains the axis of each cylinder of the pair of embossing cylinders; and wherein a third plane containing the axis of the second cylinder and an axis of the corresponding pressure roller is essentially perpendicular to the second plane.

4. Device according to claim 1, wherein a first plane containing the axis of the first cylinder which is associated with said laminating roller and an axis of the corresponding pressure roller forms an angle other than 90° and 180° with respect to a second plane which contains the axis of each cylinder of the pair of embossing cylinders; and wherein a third plane containing the axis of the second cylinder and an axis of the corresponding pressure roller is essentially perpendicular to the second plane.

5. Device according to claim 4, wherein each of said axes of the pair of embossing cylinders lies in a horizontal plane.

6. Device according to claim 1, wherein the pair of embossing cylinders can be synchronized essentially without changing a distance between centers of the cylinders.

7. Device according to claim 6, wherein said laminating roller can either be made to press against said first cylinder or to move away from the first cylinder.

8. Device according to claim 6, wherein a first plane containing the axis of the first cylinder which is associated with said laminating roller and an axis of the corresponding pressure roller forms an angle other than 90° and 180° with respect to a second plane which contains the axis of each cylinder of the pair of embossing cylinders; and wherein a third plane containing the axis of the second cylinder and an axis of the corresponding pressure roller is essentially perpendicular to the second plane.

9. Device according to claim 1, 6, 2, 7, 4, 8, 3 or 5, wherein a first one of the pair of pressure rollers is positioned above said first embossing cylinder and a second one of said pair of pressure rollers is positioned below the second embossing cylinder.

10. Device according to claim 1, 6, 2, 7, 4, 8 or 3, wherein the first cylinder with the larger diameter is associated with a cleaning device, the cleaning device being positioned between the laminating,roller and the corresponding pressure roller.

11. Device according to claim 4, 8 or 3, wherein the first plane forms an angle of between 90 and 125° with the second plane.

12. Device according to claim 1, 6, 2, 7, 4, 8 or 3, wherein said glue applicator has one or more glue transfer cylinder (s), whose axis or axes of rotation are coplanar with each said axis of the pair of embossing cylinders.

* * * * *